(12) United States Patent
Yen et al.

(10) Patent No.: US 8,313,200 B2
(45) Date of Patent: Nov. 20, 2012

(54) LIGHT SOURCE APPARATUS AND PROJECTION DEVICE

(75) Inventors: Chung- Hsien Yen, Hsin-Chu (TW);
I-Hsien Liu, Hsin-Chu (TW);
Chien-Ming Peng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 311 days.

(21) Appl. No.: 12/713,186

(22) Filed: Feb. 26, 2010

(65) Prior Publication Data
US 2011/0211171 A1    Sep. 1, 2011

(51) Int. Cl.
*G03B 21/14*   (2006.01)
*G03B 21/18*   (2006.01)
(52) U.S. Cl. .......................... 353/119; 353/57
(58) Field of Classification Search .............. 353/57, 353/119; 362/285, 294, 373
See application file for complete search history.

(56) References Cited

U.S. PATENT DOCUMENTS

| 2007/0019168 A1* | 1/2007 | Nakagawa et al. ............ 353/58 |
| 2007/0109786 A1* | 5/2007 | Lu ................................. 362/285 |
| 2008/0106701 A1* | 5/2008 | Yamaoka et al. .............. 353/52 |
| 2008/0186606 A1* | 8/2008 | Sugano ......................... 359/871 |

FOREIGN PATENT DOCUMENTS

| TW | 200624870 | 7/2006 |
| TW | 200941120 | 10/2009 |

\* cited by examiner

*Primary Examiner* — Thanh Luu
*Assistant Examiner* — Danell L Owens
(74) *Attorney, Agent, or Firm* — Jianq Chyun IP Office

(57) ABSTRACT

A light source apparatus adapted to a projection device having a casing and an optical engine base is provided. The light source apparatus includes a shell, a positioning element, a frame, and a light source. The shell is adapted to be disposed in the casing and lean against the optical engine base. The positioning element is assembled to the shell and has two positioning holes. The frame is disposed in the shell and has two positioning pins, wherein the two positioning pins are inserted into the two positioning holes respectively for positioning the frame with respect to the shell. The light source is fixed to the frame. A projection device is also provided.

12 Claims, 4 Drawing Sheets

LIGHT SOURCE APPARATUS AND PROJECTION DEVICE

BACKGROUND OF THE INVENTION

1. Field of the Invention

The present invention relates to an optical apparatus. More particularly, the present invention relates to a light source apparatus.

2. Description of Related Art

A projection device is a display apparatus for producing a large-size image. The image of the projection device is produced by using a light valve to convert an illumination beam generated by a light source module into an image beam and a lens module to project the image beam onto a screen or a wall. Following the development of the projection technology and reduction of fabrication cost, application of the projection devices has been gradually expanded from commercial use to home use.

Particularly, a light source of the projection device is disposed in a shell, and the shell is fixed to an optical engine base. For positioning the light source onto the shell, the light source is fixed to a frame having positioning pins, and the positioning pins are inserted into positioning holes forming on a positioning element disposed at the shell. In general, the positioning element and the shell may be formed as an integrative unit, wherein a material of the positioning element and the shell is, for example, aluminum, and the fabrication cost is increased.

The positioning element also may be formed as an integrative unit with a plastic casing of the projection device to lower the fabrication cost. However, an opening forming on the shell and exposing the positioning element is needed, wherein the air flow for heat dissipating is leaked through the opening, and the heat dissipating efficiency may be reduced. On the other hand, Taiwan Patent Publication Nos. TW200624870 and TW200941120 disclosed some techniques about light source module for projection device.

SUMMARY OF THE INVENTION

The present invention is to provide a light source apparatus capable of improving the heat dissipating efficiency and reducing the fabrication cost.

The present invention is to provide a projection device capable of improving the heat dissipating efficiency and reducing the fabrication cost.

An embodiment of the present invention provides a light source apparatus adapted to a projection device having a casing and an optical engine base is provided. The light source apparatus includes a shell, a positioning element, a frame, and a light source. The shell is adapted to be disposed in the casing and lean against the optical engine base. The positioning element is assembled to the shell and has two positioning holes. The frame is disposed in the shell and has two positioning pins, wherein the two positioning pins are inserted into the two positioning holes respectively for positioning the frame with respect to the shell. The light source is fixed to the frame.

In another embodiment of the present invention provides a projection device including a casing, an optical engine base disposed in the casing, and a light source apparatus disposed in the casing. The light source apparatus includes a shell, a positioning element, a frame, and a light source. The shell is disposed in the casing and lean against the optical engine base. The positioning element is assembled to the shell and has two positioning holes. The frame is disposed in the shell and has two positioning pins, wherein the two positioning pins are inserted into the two positioning holes respectively for positioning the frame with respect to the shell. The light source is fixed to the frame.

In summary, the embodiment or embodiments of the invention may have at least one of the following advantages. The positioning element having the positioning holes is assembled to the shell, and the positioning pins of the frame disposed in the shell are adapted to be inserted into the positioning holes for positioning the light source with respect to the shell. Thus, the positioning element and the shell do not have to be formed as an integrative unit, such that the fabrication cost is reduced. In addition, since the positioning element is not extended from the casing, no opening is needed to be formed on the shell to expose the positioning element, such that the air flow for heat dissipating may not be leaked and the heat dissipating efficiency may be improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
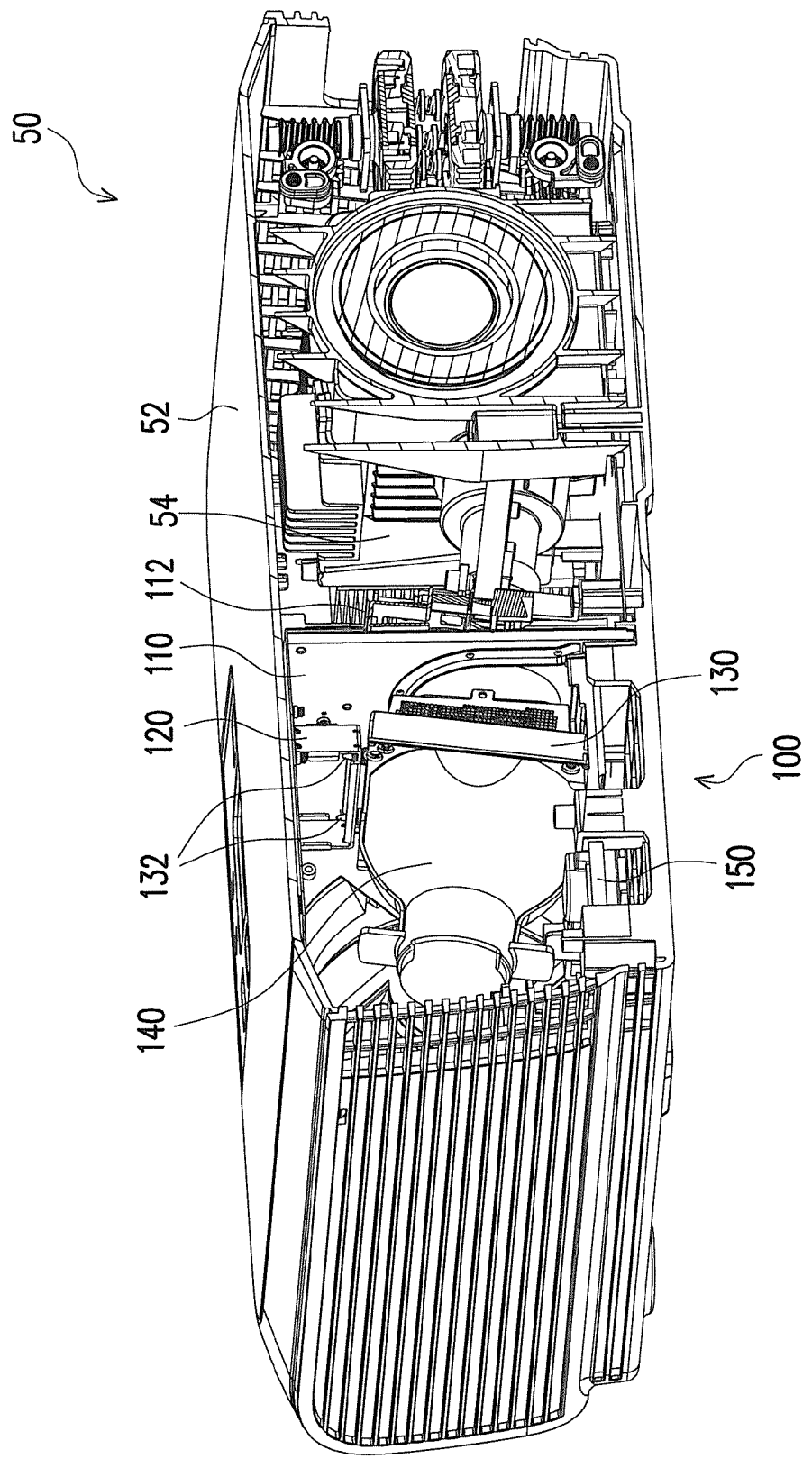
FIG. 1 is a partial schematic view showing a projection device having a light source apparatus according to one embodiment of the present invention.
Figure 2:
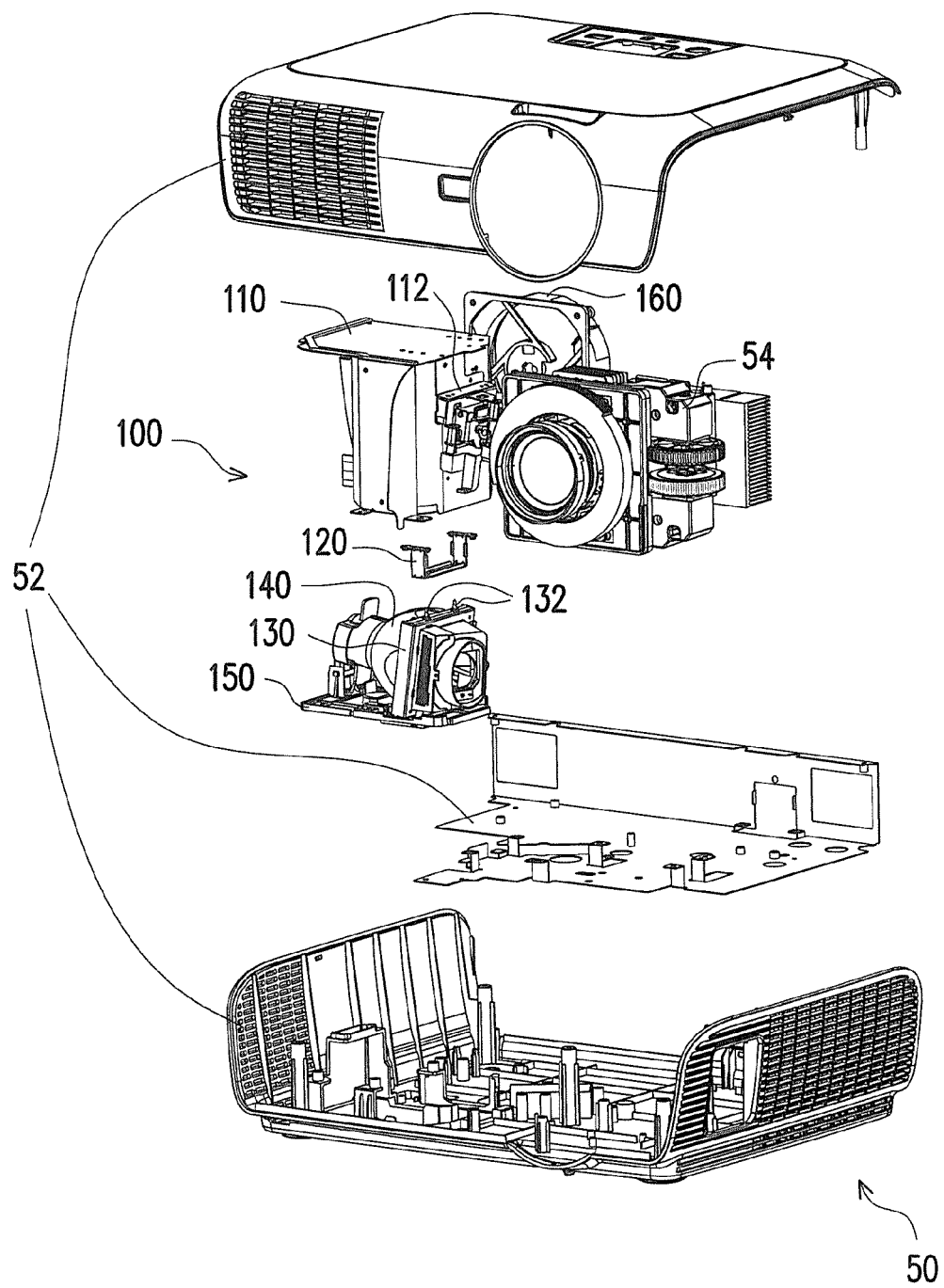
FIG. 2 is an exploded view showing the projection device of FIG. 1.
Figure 3:
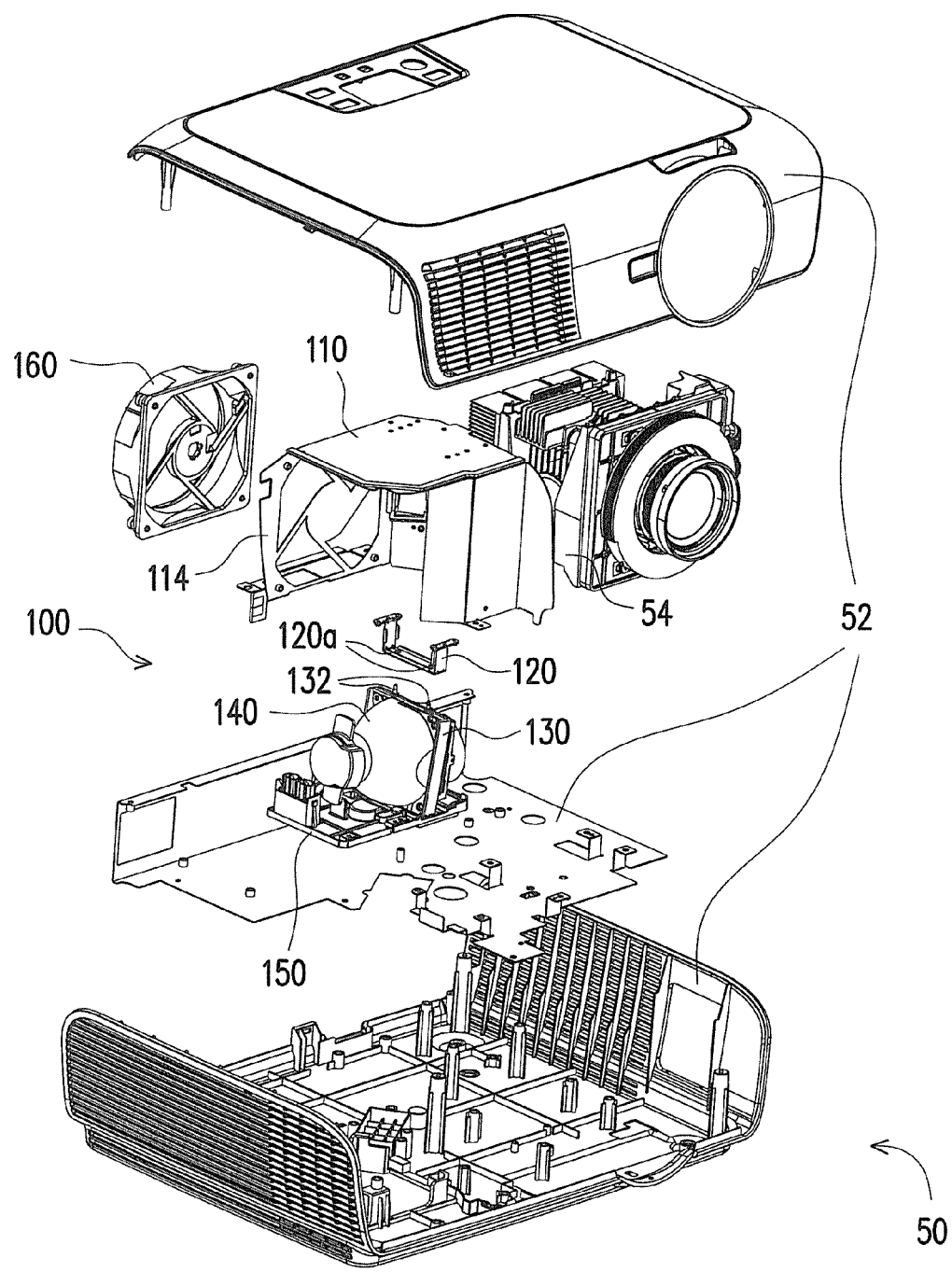
FIG. 3 is another exploded view showing the projection device of FIG. 1.

FIG. 1 is a partial schematic view showing a projection device having a light source apparatus according to one embodiment of the present invention. FIG. 2 is an exploded view showing the projection device of FIG. 1. FIG. 3 is another exploded view showing the projection device of FIG. 1. Referring to FIG. 1 to FIG. 3, in the present embodiment, a light source apparatus 100 of the embodiment is adapted to a projection device 50 having a casing 52 and an optical engine base 54. The light source apparatus 100 includes a shell 110, a positioning element 120, a frame 130, and a light source 140.

The shell 110 is adapted to be disposed in the casing 52 and lean against the optical engine base 54. The positioning element 120 is assembled to the shell 110 and has two positioning holes 120a (shown in FIG. 3). The frame 130 is disposed in the shell 110 and has two positioning pins 132, wherein the two positioning pins 132 are inserted into the two positioning holes 120a respectively for positioning the frame 130 with respect to the shell 110, and the light source 140 is fixed to the frame 130 for being positioned with respect to the optical engine base 54 indirectly.

In this embodiment, the positioning element 120 is, for example, a sheet metal part, and assembled to the shell 110. In other words, the positioning element 120 and the shell 110 do not have to be formed as an integrative unit, such that the fabrication cost is reduced. In addition, since the positioning element 120 is not extended from the casing 52, no opening is needed to be formed on the shell 110 to expose the positioning element 120, such that the air flow for heat dissipating may not be leaked, and the heat dissipating efficiency is improved.

Figure 4:
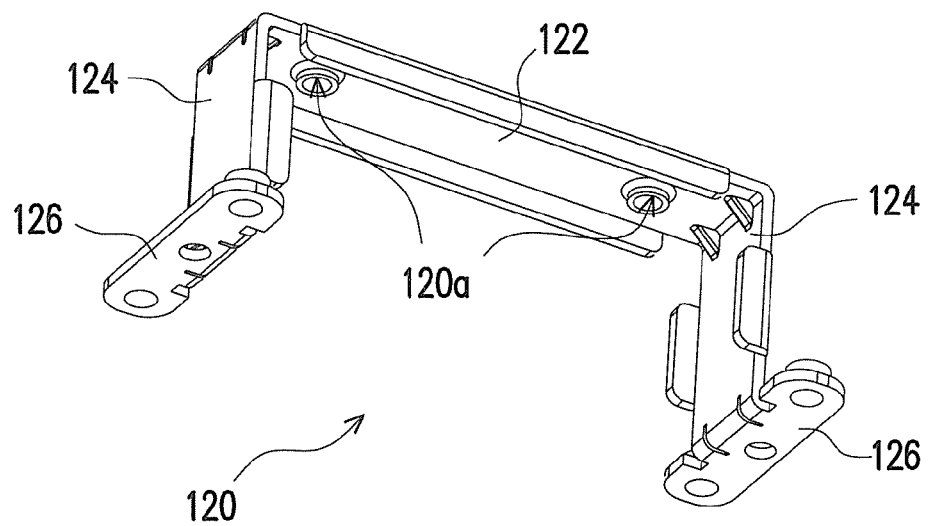
FIG. 4 is a schematic view showing the positioning element of FIG. 1.

FIG. 4 is a schematic view showing the positioning element of FIG. 1. Referring to FIG. 4, particularly, the positioning element 120 of this embodiment includes a hole-forming portion 122, at least one supporting portion 124 (two shown) and at least one mounting portion 126 (two shown). The positioning holes 120a are formed on the hole-forming portion 122, the supporting portions 124 are connected to two ends of the hole-forming portion 122 respectively, and the mounting portions 126 are connected to the supporting portions 124 respectively for being fastened onto the shell 110 (shown in FIG. 1 to FIG. 3).

Noticeably, the hole-forming portion 122 and the supporting portions 124 define a U-shape structure, and the air flow for heat dissipating is able to pass between the hole-forming portion 122 and the supporting portions 124 for promoting heat convection, such that the heat dissipating efficiency is further improved.

Referring to FIG. 1 to FIG. 3, the light source apparatus 100 of the embodiment further includes a base 150. The base 150 is disposed in the casing 52, and the frame 130 is fixed on the base 150. Besides, the shell 110 has a positioning part 112 (shown in FIG. 1 and FIG. 2) leaning against the optical engine base 54 for positioning the shell 110 with respect to the optical engine base 54. The shell 110 further has a fan mounting portion 114 (shown in FIG. 3), and the light source apparatus 100 further includes a fan 160 mounting to the fan mounting portion 114, wherein the fan 160 is capable of providing the air flow for heat dissipating.

In summary, the embodiment or embodiments of the invention may have at least one of the following advantages. The positioning element having the positioning holes is assembled to the shell, and the positioning pins of the frame disposed in the shell are capable of being inserted into the positioning holes for positioning the light source with respect to the shell. Thus, the positioning element and the shell do not have to be formed as an integrative unit, such that the fabrication cost is reduced. In addition, since the positioning element is not extended from the casing, no opening is needed to be formed on the shell to expose the positioning element, such that the air flow for heat dissipating may not be leaked, and the heat dissipating efficiency is improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source apparatus adapted to a projection device having a casing and an optical engine base disposed in the casing, the light source apparatus comprising:
    a shell adapted to be disposed in the casing and lean against the optical engine base;
    a positioning element assembled to the shell and having two positioning holes;
    a frame disposed in the shell and having two positioning pins, wherein the two positioning pins are inserted into the two positioning holes respectively for positioning the frame with respect to the shell, the positioning element is disposed between the shell and the frame, and the positioning element and the shell form a path for air flow passing through; and a light source fixed to the frame.

2. The light source apparatus as claimed in claim 1, further comprising:

a base adapted to be disposed in the casing, wherein the frame is fixed on the base.

3. The light source apparatus as claimed in claim 2, wherein the shell has a positioning part adapted to lean against the optical engine base.

4. The light source apparatus as claimed in claim 1, further comprising:

a fan fixed to the shell, wherein the shell has a fan mounting portion for mounting the fan thereon.

5. The light source apparatus as claimed in claim 1, wherein the positioning element is a sheet metal part.

6. The light source apparatus as claimed in claim 1, wherein the positioning element comprising:

a hole-forming portion forming the positioning holes;

a supporting portion connected to the hole-forming portion; and a mounting portion connected to the supporting portion for being fastened onto the shell.

7. A projection device comprising:

a casing;

an optical engine base disposed in the casing; and a light source apparatus, disposed in the casing, the light source apparatus comprising:

a shell disposed in the casing and leaning against the optical engine base;

a positioning element assembled to the shell and having two positioning holes;

a frame disposed in the shell and having two positioning pins, wherein the two positioning pins are inserted into the two positioning holes respectively for positioning the frame with respect to the shell, the positioning element is disposed between the shell and the frame, and the positioning element and the shell form a path for air flow passing through; and a light source fixed to the frame.

8. The projection device as claimed in claim 7, further comprising:

a base disposed in the casing, wherein the frame is fixed on the base.

9. The projection device as claimed in claim 8, wherein the shell has a positioning part adapted to lean against the optical engine base.

10. The projection device as claimed in claim 7, further comprising:

a fan fixed to the shell, wherein the shell has a fan mounting portion for mounting the fan thereon.

11. The projection device as claimed in claim 7, wherein the positioning element is a sheet metal part.

12. The projection device as claimed in claim 7, wherein the positioning element comprising:

a hole-forming portion forming the positioning holes;

a supporting portion connected to the hole-forming portion; and a mounting portion connected to the supporting portion for being fastened onto the shell.

\* \* \* \* \*